United States Patent
Xia et al.

(10) Patent No.: US 9,879,161 B2
(45) Date of Patent: Jan. 30, 2018

(54) OPTICALLY CLEAR ADHESIVE, METHOD OF USE AND ARTICLES THEREFROM

(75) Inventors: Jianhui Xia, Woodbury, MN (US); Albert I. Everaerts, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 460 days.

(21) Appl. No.: 13/985,602

(22) PCT Filed: Feb. 17, 2012

(86) PCT No.: PCT/US2012/025591
§ 371 (c)(1),
(2), (4) Date: Aug. 15, 2013

(87) PCT Pub. No.: WO2012/112856
PCT Pub. Date: Aug. 23, 2012

(65) Prior Publication Data
US 2013/0323521 A1  Dec. 5, 2013

Related U.S. Application Data

(60) Provisional application No. 61/444,503, filed on Feb. 18, 2011.

(51) Int. Cl.
*C09J 133/08* (2006.01)
*B32B 7/12* (2006.01)
*C09J 7/02* (2006.01)
*C09J 4/06* (2006.01)
*C09J 133/26* (2006.01)
(Continued)

(52) U.S. Cl.
CPC ............... *C09J 133/08* (2013.01); *B32B 7/12* (2013.01); *B32B 17/10036* (2013.01); *B32B 17/10743* (2013.01); *C09J 4/06* (2013.01); *C09J 5/06* (2013.01); *C09J 7/0217* (2013.01); *C09J 133/14* (2013.01); *C09J 133/26* (2013.01); *B32B 2307/412* (2013.01); *B32B 2457/20* (2013.01); *C09J 2203/318* (2013.01); *Y10T 428/31938* (2015.04)

(58) Field of Classification Search
None
See application file for complete search history.

(56) References Cited

U.S. PATENT DOCUMENTS 5,541,371 A     7/1996  Wang
5,695,837 A  *  12/1997  Everaerts ............... C09J 7/0217
                                                       428/317.1
(Continued)

FOREIGN PATENT DOCUMENTS

JP    2002047468    2/2002
JP    2003-183596   7/2003
(Continued)

OTHER PUBLICATIONS

International Search Report for PCT Application No. PCT2012/025591 dated May 22, 2012, 3 pages.

*Primary Examiner* — Monique Jackson (57) ABSTRACT

An adhesive composition includes an alkyl (meth)acrylate ester, wherein the alkyl group has 4 to 18 carbon atoms, a hydrophilic copolymerizable monomer and a free-radical generating initiator. The adhesive composition has a tan delta value of between about 0.5 and about 1.0 at a temperature of between about 25 C and about 100 C.

19 Claims, 1 Drawing Sheet

(51) Int. Cl.
*B32B 17/10* (2006.01)
*C09J 5/06* (2006.01)
*C09J 133/14* (2006.01)

(56) References Cited

U.S. PATENT DOCUMENTS

| | | |
|---|---|---|
| 6,294,607 B1 | 9/2001 | Guo |
| 7,148,882 B2 | 12/2006 | Kamrath |
| 7,465,493 B2 | 12/2008 | Lu |
| 7,538,760 B2 | 5/2009 | Hotelling |
| 2007/0117918 A1* | 5/2007 | Kim .................. C09J 133/06 524/556 |
| 2009/0073135 A1 | 3/2009 | Lin |
| 2009/0219257 A1 | 3/2009 | Frey |
| 2009/0237374 A1 | 9/2009 | Li |
| 2009/0309616 A1 | 12/2009 | Klinghult |
| 2010/0120931 A1 | 5/2010 | Zajaczkowski |
| 2011/0033720 A1 | 2/2011 | Fujita |
| 2011/0112249 A1* | 5/2011 | Takarada .................. C09J 7/00 525/123 |
| 2012/0156456 A1* | 6/2012 | Niimi .................. C09J 7/0267 428/214 |

FOREIGN PATENT DOCUMENTS

| | | |
|---|---|---|
| JP | 2008-248226 | 10/2008 |
| WO | WO 2003-078536 | 9/2003 |
| WO | WO 2009-154812 | 12/2009 |
| WO | WO 2011-156447 | 12/2011 |

\* cited by examiner

OPTICALLY CLEAR ADHESIVE, METHOD OF USE AND ARTICLES THEREFROM

CROSS REFERENCE TO RELATED APPLICATIONS

This application is a national stage filing under 35 U.S.C. 371 of PCT/US2012/025591, filed Feb. 17, 2012, which claims priority to U.S. Provisional Application No. 61/444,503, filed Feb. 18, 2011, the disclosure of which is incorporated by reference in its/their entirety herein.

TECHNICAL FIELD

The present invention is generally related to the field of optically clear adhesives. In particular, the present invention is related to optically clear adhesives having low modulus and high tan delta values.

BACKGROUND

Capacitive touch technology has found increasing utility in various applications, including mobile hand-helds, netbooks and laptop computers. Compared to other touch technologies, capacitive touch enables very sensitive response as well as features such as multi-touch. Optically clear adhesives (OCAs) are often used for bonding purposes (e.g., attachment of different display component layers) in the capacitive touch panel assembly.

Not only do OCAs provide mechanical bonding, but they also can greatly increase the optical quality of the display by eliminating air gaps that reduce brightness and contrast. The optical performance of a display can be improved by minimizing the number of internal reflecting surfaces, thus it may be desirable to remove or at least minimize the number of air gaps between optical elements in the display.

In display assembly, bonding a touch panel or display panel (such as a liquid crystal display (LCD) panel) to a three-dimensional (3D) cover glass by means of an optically clear adhesive can sometimes be challenging. Indeed, newer designs use cover glasses having a thick (approaching 50 micrometers) ink step around the perimeter or frame of the cover glass, generating a substrate that is no longer flat but is a 3-D lens. The region encompassed by the ink step is often referred to as a gap. In addition to the large ink step, other 3D features that may require good adhesive wetting of any of the display components, include things like the presence of a flex connector, slight curvature of the components, thicker ITO patterns, presence of raised integrated circuits on a touch panel and the like.

There is thus an increasing need for soft OCAs, which enable better wetting of thick inks on the display. Additionally, they can improve stress relief as a result of the display module assembly process. Such stress relieving features are particularly beneficial to reduce Mura (optical image distortion that may result from dimensional distortion) when bonding LCM and can also minimize delayed-bubble formation. A further beneficial feature of soft OCAs is short assembly cycle times.

SUMMARY

In one embodiment, the present invention is an adhesive composition including an alkyl (meth)acrylate ester, wherein the alkyl group has 4 to 18 carbon atoms, a hydrophilic copolymerizable monomer and a free-radical generating initiator. The adhesive composition maintains a tan delta value of between about 0.5 to about 1.0 at a temperature of between about 25° C. and about 100° C.

In another embodiment, the present invention is a laminate including a first substrate, a second substrate, and an adhesive composition positioned between the first and second substrates. The adhesive composition includes an alkyl (meth)acrylate ester, a hydrophilic copolymerizable monomer, and a free-radical generating initiator. The alkyl group has 4 to 18 carbon atoms. The adhesive composition maintains a tan delta value of between about 0.5 and about 1.0 between about 25° C. and about 100° C.

In another embodiment, the present invention is a method of preparing an adhesive composition including providing a pre-mix of adhesive components, partially polymerizing the pre-mix of adhesive components to form a syrup, adding a free-radical generating initiator to the syrup to form an adhesive composition precursor, and curing to form the adhesive composition. The pre-mix of adhesive components includes an alkyl (meth)acrylate ester, wherein the alkyl group has 4 to 18 carbon atoms, and a hydrophilic copolymerizable monomer. The adhesive composition maintains a tan delta value of between about 0.5 and 1.0 at between about 25° C. and about 100° C.

In yet another embodiment, the present invention is method of assembling a laminate. The method includes providing an adhesive composition; laminating the adhesive composition at a temperature of between about 25° C. and about 60° C., wherein a tan delta value of the adhesive composition during lamination is between about 0.5 and about 1.0; and autoclaving the adhesive composition, wherein a tan delta value of the adhesive composition during autoclaving is between about 0.6 and about 1.0. The adhesive composition includes an alkyl (meth)acrylate ester, wherein the alkyl group has 4 to 18 carbon atoms and a hydrophilic copolymerizable monomer and a free-radical generating initiator.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present invention is an adhesive composition and corresponding method and article for assembling optical displays. The adhesive composition has desirable flow characteristics that lead to good thick ink-step lamination, short assembly cycle times, and durable laminates. A laminate is defined as including at least a first substrate, a second substrate and an adhesive positioned between the first and second substrates. The adhesive composition allows for trapped bubbles formed during lamination to easily escape the adhesive matrix and the adhesive substrate interface, resulting in a bubble-free laminate after autoclave treatment. As a result, minimum lamination defects are observed after lamination and autoclave treatment. The combined benefits of good substrate wetting and easy bubble removal enables an efficient lamination process with greatly shortened cycle times. Additionally, the good stress relaxation and substrate adhesion from the adhesive allow for durable bonding of the laminate (e.g., no bubble/delamination after accelerated aging tests). To achieve these effects, the adhesive composition has certain rheological properties, such as low shear storage modulus (G') and high tan delta values.

Optical materials may be used to fill gaps between optical components or substrates of optical assemblies. Optical assemblies comprising a display panel bonded to an optical substrate may benefit if the gap between the two is filled with an optical material that matches or nearly matches the refractive indices of the panel and the substrate. For example, sunlight and ambient light reflection inherent between a display panel and an outer cover sheet may be reduced. Color gamut and contrast of the display panel can be improved under ambient conditions. Optical assemblies having a filled gap can also exhibit improved shock-resistance compared to the same assemblies having an air gap.

An optical assembly having a large size or area can be difficult to manufacture, especially if efficiency and stringent optical quality are desired. A gap between optical components may be filled by pouring or injecting a curable composition into the gap followed by curing the composition to bond the components together. However, these commonly used compositions have long flow-out times which contribute to inefficient manufacturing methods for large optical assemblies.

The optically clear adhesive may be used in transfer tape format to fill the air gap between the display substrates. In this process, the liquid adhesive composition precursor of this invention can be applied between two siliconized release liners, at least one of which is transparent to UV radiation that is useful for curing. The adhesive composition can then be cured (polymerized) by exposure to actinic radiation at a wavelength at least partially absorbed by a photoinitiator contained therein. Alternatively, a thermally activated free-radical initiator may be used, where the liquid adhesive composition of this invention can be coated between two siliconized release liners and exposed to heat to complete the polymerization of the composition. A transfer tape that includes a pressure-sensitive adhesive can be thus formed. The formation of a transfer tape can reduce stress in the adhesive by allowing the cured adhesive to relax prior to lamination. For example, in a typical assembly process, one of the release liners of the transfer tape can be removed and the adhesive can be applied to the display assembly. Then, the second release liner can be removed and lamination to the substrate can be completed. When the substrate and the display panel are rigid adhesive bonding can be assisted with vacuum lamination equipment to assure that bubbles are not formed in the adhesive or at the interfaces between the adhesive and the substrate or display panel. Finally, the assembled display components can be submitted to an autoclave step to finalize the bond and make the optical assembly free of lamination defects.

When the cured adhesive transfer tape is laminated between a printed lens and a second display substrate, prevention of optical defects can be even more challenging because the fully cured adhesive may have to conform to a sometimes large ink step (i.e., 50-70 µm) and the total adhesive thickness acceptable in the display may only be 150-250 µm. Completely wetting this large ink step during initial assembly (for example, when printed lens is laminated to the second substrate with the optically clear adhesive transfer tape of this invention) is very important, because any trapped air bubbles may become very difficult to remove in the subsequent display assembly steps. The optically clear adhesive transfer tape needs to have sufficient compliance (for example, low shear storage modulus, G', at lamination temperature, typically 25° C., of <10e5 Pascal (Pa) when measured at 1 Hz frequency) to enable good ink wetting, by being able to deform quickly, and to comply to the sharp edge of the ink step contour. The adhesive of the transfer tape also has to have sufficient flow to not only comply with the ink step but also wet more completely to the ink surface. The flow of the adhesive can be reflected in the high tan delta value of the material over a broad range of temperatures (i.e. tan $\delta$>0.5 between the glass transition temperature (Tg) of the adhesive (measured by DMTA) and about 50° C. or slightly higher). The stress caused by the rapid deformation of the optically clear adhesive tape by the ink step requires the adhesive to respond much faster than the common stress caused by a coefficient of thermal expansion mismatch, such as in polarizer attachment applications where the stress can be relieved over hours instead of seconds or shorter. However, even those adhesives that can achieve this initial ink step wetting may still have too much elastic contribution from the bulk rheology and this can cause the bonded components to distort, which is not acceptable. Even if these display components are dimensionally stable, the stored elastic energy (due to the rapid deformation of the adhesive over the ink step) may find a way to relieve itself by constantly exercising stress on the adhesive, eventually causing failure. Thus, as in the case of liquid bonding of the display components, the design of a transfer tape to successfully bond the display components requires a delicate balance of adhesion, optics, drop test tolerance, as well as compliance to high ink steps, and good flow even when the ink step pushes into the adhesive layer up to as much as 30% or more of its thickness.

The adhesive composition generally includes at least one alkyl(meth)acrylate ester, wherein the alkyl group has 4 to 18 carbon atoms, at least one hydrophilic copolymerizable monomer and a free-radical generating initiator. The adhesive composition may also optionally include a molecular weight control agent, a cross-linker and/or a coupling agent.

Useful alkyl acrylates (i.e., acrylic acid alkyl ester monomers) include, but are not limited to, linear or branched monofunctional acrylates or methacrylates of non-tertiary alkyl alcohols, the alkyl groups of which have from 1 to 18 carbon atoms, and in particular, from 1 to 12 carbon atoms. Examples of suitable monomers include, but are not limited to: 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth) acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth) acrylate, phenyl meth(acrylate), benzyl meth(acrylate), isostearylacrylate and 2-methylbutyl (meth)acrylate, and combinations thereof. Examples of suitable alkyl(meth) acrylate esters include, but are not limited to: 2-ethylhexyl acrylate (2-EHA), isobornyl acrylate (IBA), iso-octylacrylate (IOA) and butyl acrylate (BA). The low Tg yielding acrylates, such as IOA, 2-EHA, and BA provide tack to the adhesive, while the high Tg yielding monomers like IBA allow for the adjustment of the Tg of the adhesive composition without introducing polar monomers. An acrylate is considered as yielding a low Tg if the Tg of its homopolymer is between about −70° C. and about 20° C. An acrylate is considered as yielding a high Tg if the Tg of its homopolymer is between about 20° C. and about 200° C. Another example of a high Tg yielding monomer includes VeOVA 9, a commercially available vinyl ester (available from Momentive Specialty Chemicals, USA). Another useful high Tg yielding monomer is N-t-octylacrylamide.

Examples of suitable hydrophilic copolymerizable monomers include, but are not limited to: acrylic acid (AA), methacrylic acid, itaconic acid, fumaric acid, methacrylamide, N-alkyl substituted and N,N-dialkyl substituted acrylamides or methacrylamides where the alkyl group has up to 3 carbons, 2-hydroxyethyl acrylate (HEA), and 2-hydroxypropyl acrylate (HPA), 4-hydro xybutylacrylate, 2-ethoxyethoxyethyl acrylate (Visco at −190), 2-methoxyethoxyethylacrylate, acrylamide (Acm), N-morpholino acrylate (MoA), and diacetoneacrylamide. These monomers often also promote adhesion to the substrates encountered in display assembly. In one embodiment, the adhesive composition includes between about 60 to about 95 parts of the alkyl (methyl)acrylate ester, wherein the alkyl group has 4 to 18 carbon atoms, and between about 5 and about 40 parts of the hydrophilic copolymerizable monomer. Particularly, the adhesive composition includes between about 65 to about 95 parts of the alkyl(methyl)acrylate ester, wherein the alkyl group has 4 to 18 carbon atoms, and between about 5 and about 35 parts of the hydrophilic copolymerizable monomer.

Combinations of polar monomers and the hydrophilic, hydroxyl functional monomeric compound may also be used. Combinations of these types of monomers allow for adhesive compositions with good cohesive strength due to internal hydrogen bonding between the polar monomer and the hydrophilic, hydroxyl functional monomeric compound. These compositions may also have a broadened glass transition temperature (Tg), which in turn may broaden the lamination window for the adhesive composition.

In one embodiment, the adhesive composition may include an acrylic oligomer. The acrylic oligomer can be a substantially water-insoluble acrylic oligomer derived from (methacrylate monomers). In general, (meth)acrylate refers to both acrylate and methacrylate functionality.

The acrylic oligomer can be used to control the viscous to elastic balance of the cured composition of the invention and the oligomer contributes mainly to the viscous component of the rheology. In order for the acrylic oligomer to contribute to the viscous rheology component of the cured composition, the (meth)acrylic monomers used in the acrylic oligomer can be chosen in such a way that glass transition of the oligomer is below 25° C., typically below 0° C. The oligomer can made from (meth)acrylic monomers and can have a weight average molecular weight (Mw) of at least 1,000, typically 2,000. It should not exceed the entanglement molecular weight (Me) of the oligomer composition. If the molecular weight is too low, outgassing and migration of the component can be problematic. If the molecular weight of the oligomer exceeds Me, the resulting entanglements can contribute to a less desirable elastic contribution to the rheology of the adhesive composition. Mw can be determined by GPC. Me can be determined by measuring the viscosity of the pure material as a function of molecular weight. By plotting the zero shear viscosity versus molecular weight in a log/log plot the point of change in slope corresponds to as the entanglement molecular weight. Above the Me the slope will increase significantly due to the entanglement interaction. Alternatively, for a given monomer composition, Me can also be determined form the rubbery plateau modulus value of the polymer in dynamic mechanical analysis provided we know the polymer density as is known by those of ordinary skill in the art. The general Ferry equation $G_0 = rRT/Me$ provides a relationship between Me and the modulus $G_0$. Typical entanglement molecular weights for (meth)acrylic polymers are on the order of 30,000-60,000.

The acrylic oligomer can include a substantially water-insoluble acrylic oligomer derived from (meth)acrylate monomers. Substantially water-insoluble acrylic oligomer derived from (meth)acrylate monomers are well known and are typically used in urethane coatings technology. Due to their ease of use, favorable acrylic oligomers include liquid acrylic oligomer derived from (meth)acrylate monomers. The liquid acrylic oligomer derived from (meth)acrylate monomers can have a number average molecular weight (Mn) within the range of about 500 to about 10,000. Commercially available liquid acrylic oligomers also have a hydroxyl number of from about 20 mg KOH/g to about 500 mg KOH/g, and a glass transition temperature (Tg) of about −70° C. These liquid acrylic oligomers derived from (meth)acrylate monomers typically comprise recurring units of a hydroxyl functional monomer. The hydroxyl functional monomer is used in an amount sufficient to give the acrylic oligomer the desired hydroxyl number and solubility parameter. Typically the hydroxyl functional monomer is used in an amount within the range of about 2% to about 60% by weight (wt %) of the liquid acrylic oligomer. Instead of hydroxyl functional monomers, other polar monomers such as acrylic acid, methacrylic acid, itaconic acid, fumaric acid, acrylamide, methacrylamide, N-alkyl and N,N-dialkyl substituted acrylamide and methacrylamides, N-vinyl lactams, N-vinyl lactones, and the like can also be used to control the solubility parameter of the acrylic oligomer. Combinations of these polar monomers may also be used. The liquid acrylic oligomer derived from acrylate and (meth)acrylate monomers also typically comprises recurring units of one or more C1 to C20 alkyl (meth)acrylates whose homopolymers have a Tg below 25° C. It is important to select a (meth) acrylate that has low homopolymer Tg because otherwise the liquid acrylic oligomer can have a high Tg and may not stay liquid at room temperature. However, the acrylic oligomer does not always need to be a liquid, provided it can readily be solubilized in the balance of the adhesive composition used in this invention. Examples of suitable commercial (meth)acrylates include n-butyl acrylate, n-butyl methacrylate, lauryl acrylate, lauryl methacrylate, isooctyl acrylate, isononylacrylate, isodecylacrylate, tridecyl acrylate, tridecyl methacrylate, 2-ethylhexyl acrylate, 2-ethylhexyl methacrylate, and mixtures thereof. The proportion of recurring units of C1 to C20 alkyl acrylates or methacrylates in the acrylic oligomer derived from acrylate and methacrylate monomers depends on many factors, but most important among these are the desired solubility parameter and Tg of the resulting adhesive composition. Typically liquid acrylic oligomer derived from acrylate and methacrylate monomers can be derived from about 40% to about 98% alkyl (meth) acrylate monomers.

Optionally, the acrylic oligomer derived from (meth) acrylate monomers can incorporate additional monomers. The additional monomers can be selected from vinyl aromatics, vinyl halides, vinyl ethers, vinyl esters, unsaturated nitriles, conjugated dienes, and mixtures thereof. Incorporation of additional monomers may reduce raw material cost or modify the acrylic oligomer properties. For example, incorporating styrene or vinylacetate into the acrylic oligomer can reduce the cost of the acrylic oligomer.

Suitable liquid acrylic oligomers include copolymers of n-butyl acrylate and allyl monopropoxylate, n-butyl acrylate and allyl alcohol, n-butyl acrylate and 2-hydroxyethyl acrylate, n-butyl acrylate and 2-hydroxy-propyl acrylate, 2-ethylhexyl acrylate and allyl propoxylate, 2-ethylhexyl acrylate and 2-hydroxy-propyl acrylate, and the like, and mixtures thereof. Exemplary acrylic oligomers useful in the provided optical assembly are disclosed, for example, in U.S. Pat. No. 6,294,607 (Guo et al.) and U.S. Pat. No. 7,465,493 (Lu), as well as acrylic oligomer derived from acrylate and methacrylate monomers having the trade name JONCRYL (available from BASF, Mount Olive, N.J.) and ARUFON (available from Toagosei Co., Lt., Tokyo, Japan).

It is also possible to make the provided acrylic oligomers in-situ. For example, if on-web polymerization is used, a monomer composition may be prepolymerized by UV or thermally induced reaction. The reaction can be carried out in the presence of a molecular weight control agent, like a chain-transfer agent, such as a mercaptan, or a retarding agent such as, for example, styrene, α-methyl styrene, α-methyl styrene dimer, to control chain-length and molecular weight of the polymerizing material. For example, when the control agent is completely consumed, the reaction can proceed to higher molecular weights and thus a true high molecular weight polymer will form. Likewise, the polymerization conditions for the first step of the reaction can be chosen in such a way that only oligomerization happens, followed by a change in polymerization conditions that yields high molecular weight polymer. For example, UV polymerization under high intensity light can result in lower chain-length growth where polymerization under lower light intensity can give higher molecular weight. In one embodiment, the molecular weight control agent is present at between about 0.025% and about 1%, and particularly between about 0.05% and about 0.5% of the composition.

To further optimize adhesive performance of the optically clear adhesive, adhesion promoting additives, such as silanes and titanates may also be incorporated into the optically clear adhesives of the present disclosure. Such additives can promote adhesion between the adhesive and the substrates, like the glass and cellulose triacetate of an LCD by coupling to the silanol, hydroxyl, or other reactive groups in the substrate. The silanes and titanates may have only alkoxy substitution on the Si or Ti atom connected to an adhesive copolymerizable or interactive group. Alternatively, the silanes and titanates may have both alkyl and alkoxy substitution on the Si or Ti atom connected to an adhesive copolymerizable or interactive group. The adhesive copolymerizable group is generally an acrylate or methacrylate group, but vinyl and allyl groups may also be used. Alternatively, the silanes or titanates may also react with functional groups in the adhesive, such as a hydroxyalkyl(meth)acrylate. In addition, the silane or titanate may have one or more group providing strong interaction with the adhesive matrix. Examples of this strong interaction include, hydrogen bonding, ionic interaction, and acid-base interaction. An example of a suitable silane includes, but is not limited to, (3-glycidyloxypropyl)trimethoxysilane.

The pressure sensitive adhesive can be inherently tacky. If desired, tackifiers can be added to the precursor mixture before formation of the pressure sensitive adhesive. Useful tackifiers include, for example, rosin ester resins, aromatic hydrocarbon resins, aliphatic hydrocarbon resins, and terpene resins. In general, light-colored tackifiers selected from hydrogenated rosin esters, terpenes, or aromatic hydrocarbon resins can be used.

Other materials can be added for special purposes, including, for example, oils, plasticizers, antioxidants, UV stabilizers, pigments, curing agents, polymer additives, and other additives provided that they do not significantly reduce the optical clarity of the pressure sensitive adhesive.

The adhesive compositions may have additional components added to the precursor mixture. For example, the mixture may include a multifunctional crosslinker. Such crosslinkers include thermal crosslinkers which are activated during the drying step of preparing solvent coated adhesives and crosslinkers that copolymerize during the polymerization step. Such thermal crosslinkers may include multifunctional isocyanates, aziridines, multifunctional (meth)acrylates, and epoxy compounds. Exemplary crosslinkers include difunctional acrylates such as 1,6-hexanediol diacrylate or multifunctional acrylates such as are known to those of skill in the art. Useful isocyanate crosslinkers include, for example, an aromatic diisocyanate available as DESMODUR L-75 from Bayer, Cologne, Germany. Ultraviolet, or "UV", activated crosslinkers can also be used to crosslink the pressure sensitive adhesive. Such UV crosslinkers may include non-copolymerizable photocrosslinkers, such as benzophenones and copolymerizable photocrosslinkers such as acrylated or methacrylate benzophenones like 4-acryloxybenzophenones.

In addition, the precursor mixtures for the provided adhesive compositions can include a thermal or a photoinitiator. Examples of thermal initiators include peroxides such as benzoyl peroxide and its derivatives or azo compounds such as VAZO 67, available from E. I. du Pont de Nemours and Co. Wilmington, Del., which is 2,2'-azobis-(2-methylbutyronitrile), or V-601, available from Wako Specialty Chemicals, Richmond, Va., which is dimethyl-2,2'-azobisisobutyrate. A variety of peroxide or azo compounds are available that can be used to initiate thermal polymerization at a wide variety of temperatures. The precursor mixtures can include a photoinitiator. Particularly useful are initiators such as IRGACURE 651, available from BASF, Tarrytown, N.Y., which is 2,2-dimethoxy-2-phenylacetophenone. Typically, the crosslinker, if present, is added to the precursor mixtures in an amount of from about 0.05 parts by weight to about 5.00 parts by weight based upon the other constituents in the mixture. The initiators are typically added to the precursor mixtures in the amount of from 0.05 parts by weight to about 2 parts by weight.

The precursor mixture may also include a vinyl ester, and particularly a $C_5$ to $C_{10}$ vinyl ester. An example of a commercially available suitable vinyl ester includes, but is not limited to VeOVA 9 available from Momentive Specialty Chemicals, USA.

The adhesive composition components can be blended to form an optically clear mixture. The mixture can be polymerized by exposure to heat or actinic radiation (to decompose initiators in the mixture). This can be done prior to the addition of a cross-linker to form a coatable syrup to which, subsequently, one or more crosslinkers, and additional initiators can be added, the syrup can be coated on a liner, and cured (i.e., cross-linked) by an addition exposure to initiating conditions for the added initiators. Alternatively, the crosslinker and initiators can be added to the monomer mixture and the monomer mixture can be both polymerized and cured in one step. The desired coating viscosity can determine which procedure is used. The disclosed adhesive compositions or precursors may be coated by any variety of known coating techniques such as roll coating, spray coating, knife coating, die coating, and the like. Alternatively, the adhesive precursor composition may also be delivered as a liquid to fill the gap between the two substrates and subsequently be exposed to heat or UV to polymerize and cure the composition.

The cured adhesive composition exhibits elevated tan delta values in the region of about 25° C. and about 100° C. and more particularly in the region of about 50° C. and about 100° C. and often increases with increasing temperatures, resulting in facile lamination by common techniques such as roller lamination or vacuum lamination. Tan delta values indicate the viscous to elastic balance of the adhesive composition. A high tan delta corresponds to a more viscous character and thus, reflects the ability to flow. Generally, a higher tan delta value equates to higher flow properties. The ability of an adhesive to flow during the application/lamination process is a significant factor in the performance of the adhesive in terms of wetting the thick ink step and ease of lamination.

In a typical application of an adhesive composition for rigid-to-rigid (e.g., cover glass to touch sensor glass lamination for use in a phone or tablet device) lamination, the lamination is first carried out at either room or elevated temperature. In one embodiment, lamination is carried out at between about 25° C. and about 60° C. At the lamination temperature, the adhesive composition has a tan delta value of between about 0.5 and about 1.0. When the tan delta value is too low (i.e. below 0.5), initial wet out of the adhesive may be difficult and higher lamination pressure and/or longer press times may be required to achieve good wetting. This may result in longer assembly cycle times and possible distortion of one or more of the display substrates. Likewise, if the tan delta value becomes too high (i.e. >1.0) the adhesive composition may be too soft to resist the lamination pressures and adhesive squeeze-out or oozing may result. Such high tan delta values may also result in storage instability of any die cuts that are derived from such an adhesive. For example oozing may result if stored at room temperature. In one embodiment, the adhesive composition maintains a tan delta value of between about 0.5 and about 1.0 at a temperature of between about 25° C. and about 100° C. and particularly between about 50° C. and about 100° C. In another embodiment, the adhesive composition maintains a tan delta value of between about 0.6 and about 0.8 at a temperature of between about 25° C. and about 100° C. and particularly between about 50° C. and about 100° C.

In a subsequent step, this laminate is then subjected to an autoclave treatment where pressure and potentially heat are applied to remove any trapped bubbles during the rigid-to-rigid lamination process. The better the flow characteristics of the adhesive, the more easily the adhesive can cover thick ink-steps. Furthermore, good adhesive flow allows for the trapped bubbles from the lamination step to easily escape the adhesive matrix or the optically clear adhesive substrate interface, resulting in a bubble-free laminate after the autoclave treatment. Under autoclave temperatures, for example at about 50° C., the adhesive composition maintains a tan delta value of between about 0.6 and about 1.0. In particular, the adhesive composition maintains a tan delta value of between about 0.7 and about 1.0. When the tan delta values at typical autoclave temperatures falls below 0.6 the adhesive may not soften fast enough to further wet the substrate and to allow any lamination step entrapped air bubbles to escape. Likewise, if the tan delta value exceeds about 1.0, the viscous character of the adhesive may be too high and adhesive squeeze-out and oozing may result. Thus the combined benefits of good substrate wetting and easy bubble removal enables an efficient lamination display assembly process with greatly shortened cycle time. In one embodiment, the cycle time for vacuum lamination is less than about 15 seconds and less than about 30 minutes for autoclave treatment.

The ability of the adhesive to flow can be measured using dynamic mechanic thermal analysis (DMTA). Pressure sensitive adhesives (PSAs) are viscoelastic materials. The tan delta value from the DMA measurement is the ratio of the viscous component (shear loss modulus G") of the PSA to the elastic component (shear storage modulus G') of the PSA. At temperatures above the glass transition temperature of the PSA, higher tan delta values indicate better adhesive flow.

The tan delta value of the adhesive composition of the present invention is greater than about 0.5 at room temperature and often exceeds this value as the temperature increases. More particularly, the tan delta can exceed a value of 0.6. Tan delta may also increase as temperature increases. While high tan delta values indicate good flow at process and autoclave process conditions, this has to be counterbalanced against durability of the display. For example, for storage stability, die cutting, and durability, this value cannot be too high or the adhesive may ooze, causing the display to fail. In one embodiment, at a temperature between about 50° C. and about 100° C., the tan delta value is in the range of between about 0.5 and about 1.0, particularly between about 0.6 and about 1.0 and more particularly between about 0.6 and about 0.8. It is expected that tan delta values exceeding a value of about 1 at temperatures required for durability (i.e. 80-90° C.) may be detrimental to durability. This may be critical if the substrates in the display are dimensionally unstable and can warp or expand significantly (i.e. change dimensions by tens of microns). Likewise, values for tan delta exceeding about 1 between about 25° C. and for example the 80-90° C. required for durability, may also require special handling of the product (i.e. refrigeration) during shipping and storage. Adhesives with a tan delta value exceeding 1 in the about 25° C. to about 100° C. range may also be too soft to resist outgassing from substrates such a PMMA or polycarbonate, especially if these substrates have thicknesses on the order of about 1 mm or more, and are free of coatings (such as hard coatings) that may minimize the outgassing towards the optically clear adhesive.

To further improve the durability of the assembled display, the soft adhesive composition of the invention can be further crosslinked after assembly. For example, by exposing the adhesive composition containing a photocrosslinker, the tan delta at elevated temperature (for example 75° C.) can be reduced by crosslinking the adhesive, As such, the balance between viscous and elastic rheological behavior can be shifted towards more elastic character after the assembly process is completed.

The tan delta value of an adhesive composition can be increased by incorporating more viscous properties into the adhesive composition. For example, the adhesive composition may have a higher soluble fraction to counterbalance the elastic portion which is derived from the gel part of the formula. This balance can be shifted by changing molecular weight distribution, curing profile, etc. By controlling the tan delta values of the adhesive composition, desired adhesive flow can be achieved.

The adhesive layers described above can be formed by either thermopolymerization or photopolymerization processes. For example, the liquid composition may be cured using ultraviolet (UV) radiation. The liquid compositions described above are said to be cured using actinic radiation, i.e., radiation that leads to the production of photochemical activity. For example, actinic radiation may comprise radiation of from about 250 nm to about 700 nm. Sources of actinic radiation include tungsten halogen lamps, xenon and mercury arc lamps, incandescent lamps, germicidal lamps, fluorescent lamps, lasers and light emitting diodes. UV-radiation can be supplied using a high intensity continuously emitting system such as those available from Fusion UV Systems. If desired, the curing using actinic radiation may be assisted with heat. Alternatively to UV or visible light induced curing, a heat curing mechanism may be used. To heat cure, thermally activated initiators such as peroxides or azo compounds can be used to substitute for the photo-activated initiators in the composition as is well know by those persons having ordinary skill in the art.

When used in optical assemblies, the adhesive composition needs to be suitable for optical applications. For example, the adhesive composition may have at least 85% transmission over the range of from 460 to 720 nm. The adhesive composition may have, per millimeter thickness, a transmission of greater than about 85% at 460 nm, greater than about 90% at 530 nm, and greater than about 90% at 670 nm. These transmission characteristics provide for uniform transmission of light across the visible region of the electromagnetic spectrum which is important to maintain the color point in full color displays. Additionally, the adhesive layer typically has a refractive index that matches or closely matches that of the display panel and/or the substantially transparent substrate. For example, the adhesive layer may have a refractive index of from about 1.4 to about 1.7.

The thickness of the adhesive layer in the articles of disclosure tends to be at greater than about 5 micrometers, greater than about 10 micrometers, greater than about 15 micrometers, or even greater than about 20 micrometers. The thickness is often less than about 1000 micrometers, less than about 250 micrometers, less than about 200 micrometers, or even less than about 175 micrometers. For example, the thickness can be from about 5 to about 1000 micrometers, from about 10 to about 500 micrometers, from about 25 to about 250 micrometers, or from about 50 to about 175 micrometers.

In one embodiment, the adhesive composition is used in an optical assembly that includes a display panel. The display panel can include any type of panel such as a liquid crystal display panel. Liquid crystal display panels are well known and typically include a liquid crystal material disposed between two substantially transparent substrates such as glass or polymer substrates. As used herein, substantially transparent refers to a substrate that is suitable for optical applications, e.g., has at least 85% transmission over the range of from 460 to 720 nm. Optical substrates can have, per millimeter thickness, a transmission of greater than about 85% at 460 nm, greater than about 90% at 530 nm, and greater than about 90% at 670 nm. Transparent electrically conductive materials that function as electrodes can be present on the inner surfaces of the substantially transparent substrates. In some cases, on the outer surfaces of the substantially transparent substrates can be polarizing films that can pass essentially only one polarization state of light. When a voltage is applied selectively across the electrodes, the liquid crystal material can reorient to modify the polarization state of light, such that an image can be created. The liquid crystal display panel can also comprise a liquid crystal material disposed between a thin film transistor array panel having a plurality of thin film transistors arranged in a matrix pattern and a common electrode panel having a common electrode.

In some other embodiments, the display panel may comprise a plasma display panel. Plasma display panels are well known and typically comprise an inert mixture of noble gases such as neon and xenon disposed in tiny cells located between two glass panels. Control circuitry charges electrodes within the panel can cause the gases to ionize and form a plasma which then can excite phosphors contained therein to emit light.

In other embodiments, the display panel may comprise a light-emitting diode (LED) display panel. Light-emitting diodes can be made using organic or inorganic electroluminescent materials and are well known to those having ordinary skill in the art. These panels are essentially a layer of an electroluminescent material disposed between two conductive glass panels. Organic electroluminescent materials include organic light emitting diodes (OLEDs) or a polymer light emitting diode (PLEDs).

In some embodiments, the display panel may comprise an electrophoretic display. Electrophoretic displays are well known and are typically used in display technology referred to as electronic paper or e-paper. Electrophoretic displays can include a liquid electrically-charged material disposed between two transparent electrode panels. Liquid charged material include nanoparticles, dyes, and charge agents suspended in a nonpolar hydrocarbon, or microcapsules filled with electrically-charged particles suspended in a hydrocarbon material. The microcapsules may also be suspended in a layer of liquid polymer. In some embodiments, the display panel can include a cathode ray tube display.

The provided optical assemblies include a substantially transparent substrate. The substantially transparent substrate can include a glass or a polymer. Useful glasses can include borosilicate, soda lime, and other glasses suitable for use in display applications as protective covers. One particular glass that may be used comprises EAGLE XG and JADE glass substrates available from Corning Inc., Corning NY. Useful polymers include polyester films such as polyethylene terephthalate, polycarbonate films or plates, acrylic films such as polymethylmethacrylate films, and cycloolefin polymer films such as ZEONOX and ZEONOR available from Zeon Chemicals (Louisville, Ky.). The substantially transparent substrate typically has an index of refraction close to that of display panel and/or the adhesive layer; for example, from about 1.4 and about 1.7. The substantially transparent substrate typically has a thickness of from about 0.5 mm to about 5 mm.

The provided optical assembly can be touch-sensitive. Touch-sensitive optical assemblies (touch-sensitive panels) can include capacitive sensors, resistive sensors, and projected capacitive sensors. Such sensors include transparent conductive elements on substantially transparent substrates that overlay the display. The conductive elements can be combined with electronic components that can use electrical signals to probe the conductive elements in order to determine the location of an object near or in contact with the display. Touch-sensitive optical assemblies are well known and are disclosed, for example, in U.S. Pat. Publ. Nos. 2009/0073135 (Lin et al.), 2009/0219257 (Frey et al.), and PCT Publ. No. WO 2009/154812 (Frey et al.). Positional touch-sensitive touch panels that include force sensors are also well known and are disclosed, for example, in touch screen display sensors that include force measurement include examples based on strain gauges such as is disclosed in U.S. Pat. No. 5,541,371 (Baller et al.); examples based on capacitance change between conductive traces or electrodes residing on different layers within the sensor, separated by a dielectric material or a dielectric structure comprising a material and air such as is disclosed in U.S. Pat. No. 7,148,882 (Kamrath et al.) and U.S. Pat. No. 7,538,760 (Hotelling et al.); examples based on resistance change between conductive traces residing on different layers within the sensor, separated by a piezoresistive composite material such as is disclosed in U.S. Pat. Publ. No. 2009/0237374 (Li et al.); and examples based on polarization development between conductive traces residing on different layers within the sensor, separated by a piezoelectric material such as is disclosed in U.S. Pat. Publ. No. 2009/0309616 (Klinghult et al.). Positional touch screens are also disclosed, for example, in U.S. Ser. No. 61/353,688 (Frey et al.).

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

Test Methods
Dynamic Mechanical Thermal Analysis (DMTA)

Using an ARES G2 rheometer (available from TA Instruments, New Castle, Del.), DMTA testing was carried out on the PSAs using a parallel plate geometry with 8 mm diameter plates and a gap of 1.5 mm. Testing was conducted using a temperature scan rate of 3° C./min at a frequency of 1 Hertz and a maximum strain of 20%. The scans were performed from −20° C. to 100° C.

24 Hour Dwell

The laminates were placed in a controlled temperature and humidity environment (23° C./50% relative humidity) for 24 hours.

Durability Test

The durability test was carried out by placing the laminates in a controlled temperature and humidity chamber at 85° C./25% relative humidity for six hours. Afterwards, the laminates were checked for bubble defects or delamination.

Lamination Procedure

Using a vacuum laminator (model number TPL-0209 MH available from Takatori Corporation, Kyushu, Japan), the OCAs from the Examples and the Comparative Examples were each laminated between two cleaned float glass substrates. The dimensions of the glass substrates were 4 inch (10.2 cm)×2 inch (5.1 cm)×1 mm thick. For each pair of glass substrates, one of the glass substrates had a black ink step on all four edges in contact with the OAC. The black ink extended 6 mm from the edge and was 50 microns thick. An OCA sample was cut to the same size as the glass substrate and then hand laminated using a roller on the first glass substrate. This first glass substrate was placed on one side of the lamination stage, and a second glass substrate with the black ink was placed on the other side of the lamination stage. The two glass substrates were then laminated under vacuum in a book-closure fashion using the vacuum laminator. The lamination was conducted at room temperature with a vacuum of 30 Pa, a lamination pressure of 40 Newton/cm$^2$ and a 10 seconds press time. After the vacuum lamination, the laminate was subjected to an autoclave treatment using an autoclave (model number J-15501 available from Lorimer Corporation, Longview, Tex.) at a temperature of 40° C. and 0.5 MPa pressure for 30 minutes.

Example 1

A pressure sensitive adhesive (PSA) was prepared as follows. A monomer premix was prepared, on a weight basis, using 55 parts 2-ethylhexyl acrylate, 25 parts isobornyl acrylate, 20 parts 2-hydroxyethyl acrylate, and 0.02 parts 2-hydroxy-2-methyl-1-phenyl-1-propan-1-one photoinitiator (available under the trade designation DAROCUR 1173, available from BASF Corporation, Florham Park, N.J.). This mixture was partially polymerized under a nitrogen-rich atmosphere by exposure to ultraviolet radiation yielding a syrup having a viscosity of about 1,000 cps. Following the polymerization, 0.43 parts of 2,2-dimethoxy-2-phenylacetophenone photoinitiator (available under the trade designation IRGACURE 651 from BASF Corporation), 0.05 parts of 1,6-hexanediol diacrylate, 0.3 parts of alpha-methyl styrene (available from Sigma-Aldrich Co., St. Louis. Mo.), and 0.05 parts of (3-glycidyloxypropyl)trimethoxysilane (available under the trade designation KBM-403 from Shin-Etsu Chemical, Tokyo, Japan) were added to the syrup. The syrup was then knife coated onto a silicone-treated polyethylene terephthalate (PET) release liner at a coating thickness of 10 mils. A second PET release liner was laminated to the exposed surface of the coating. The resulting PET liner/syrup/PET liner laminate was then exposed to ultraviolet radiation having a spectral output from 300-400 nm with a maximum at 351 nm, the total energy exposure was 2,000 mJ/cm$^2$, yielding Example 1.

Example 2

A PSA was prepared as follows. A monomer premix was prepared, on a weight basis, using 35 parts 2-ethylhexyl acrylate, 35 parts isobornyl acrylate, 20 parts ethoxyethoxyethyl acrylate (VISCOAT 190, commercially available form KOWA American Corporation), 10 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.31 parts of 2,2-dimethoxy-2-phenylacetophenone photoinitiator, 0.05 parts of 1,6-hexanediol diacrylate, 0.1 parts of alpha-methyl styrene, and 0.05 parts of (3-glycidyloxypropyl)trimethoxysilane were added to the syrup. The syrup was then coated and cured between release liners as described in Example 1, producing Example 2.

Example 3

A PSA was prepared as follows. A monomer premix was prepared, on a weight basis, using 78 parts 2-ethylhexyl acrylate, 12 parts 4-acryloylmorpholine (commercially available form Kohjin Japan), 10 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.38 parts of 2,2-dimethoxy-2-phenylacetophenone photoinitiator was added to the syrup. The syrup was then coated and cured between release liners as described in Example 1, producing Example 3.

Example 4

A PSA was prepared as follows. A monomer premix was prepared, on a weight basis, using 75 parts 2-ethylhexyl acrylate, 15 parts N,N-dimethyl acrylamide (commercially available from Jarchem Industries Inc. USA), 10 parts 2-hydroxyethyl acrylate, and 0.04 parts 2,2-dimethoxy-2-phenylacetophenone photoinitiator. This mixture was partially polymerized under a nitrogen-rich atmosphere by exposure to ultraviolet radiation to provide a syrup having a viscosity of about 1,000 cps. Following the polymerization, 0.31 parts of 2,2-dimethoxy-2-phenylacetophenone photoinitiator was added to the syrup. The syrup was then coated and cured between release liners as described in Example 1, producing Example 4.

Example 5

A PSA was prepared as follows. A monomer premix was prepared, on a weight basis, using 70 parts 2-ethylhexyl acrylate, 20 parts diacetone acrylamide (commercially available from Jarchem Industries Inc. USA), 10 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.20 parts of 2,2-dimethoxy-2-phenylacetophenone photoinitiator, 0.075 parts of 1,6-hexanediol diacrylate, and 0.30 parts of Karenz MT PE1 (commercially available form Showa Denko, Japan) were added to the syrup. The syrup was then coated and cured between release liners as described in Example 1, producing Example 5.

Example 6

A PSA was prepared as follows. A monomer premix was prepared, on a weight basis, using 70 parts 2-ethylhexyl acrylate, 20 parts N-tert-octylacrylamide (commercially available from Polysciences Inc., USA), 10 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.20 parts of 2,2-dimethoxy-2-phenylacetophenone photoinitiator, 0.075 parts of 1,6-hexanediol diacrylate, and 0.30 parts of Karenz MT PE1 were added to the syrup. The syrup was then coated and cured between release liners as described in Example 1, producing Example 6.

Example 7

A PSA was prepared as follows. A monomer premix was prepared, on a weight basis, using 70 parts 2-ethylhexyl acrylate, 10 parts VeoVa 9 (commercially available from Momentive, USA), 20 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.20 parts of 2,2-dimethoxy-2-phenylacetophenone photoinitiator, 0.10 parts of 1,6-hexanediol diacrylate, and 0.30 parts of Karenz MT PE1 were added to the syrup. The syrup was then coated and cured between release liners as described in Example 1, producing Example 7.

Example 8

A PSA was prepared as follows. A monomer premix was prepared, on a weight basis, using 87.5 parts iso-octylacrylate, 12.5 parts acrylic acid, and 0.04 parts 2,2-dimethoxy-2-phenylacetophenone photoinitiator. This mixture was partially polymerized under a nitrogen-rich atmosphere by exposure to ultraviolet radiation to provide a syrup having a viscosity of about 2,000 cps. Following the polymerization, 0.36 parts of 2,2-dimethoxy-2-phenylacetophenone photoinitiator, 0.05 parts of 1,6-hexanediol diacrylate, and 0.20 parts of alpha-methyl styrene were added to the syrup. The syrup was then coated and cured between release liners as described in Example 1, producing Example 8.

Example 9

A PSA was prepared as follows. A monomer premix was prepared, on a weight basis, using 69 parts 2-ethylhexyl acrylate, 7 parts diacetone acrylamide, 5 parts isobornyl acrylate, 19 parts 2-hydroxyethyl acrylate, and 0.02 parts 2-hydroxy-2-methyl-1-phenyl-1-propan-1-one photoinitiator. This mixture was partially polymerized under a nitrogen-rich atmosphere by exposure to ultraviolet radiation to provide a syrup having a viscosity of about 1,000 cps. Following the polymerization, 0.20 parts of 2,2-dimethoxy-2-phenylacetophenone photoinitiator, 0.10 parts of 1,6-hexanediol diacrylate, and 0.30 parts of Karenz MT PE1 were added to the syrup. The syrup was then coated and cured between release liners as described in Example 1, producing Example 9.

Comparative Example A (CE-A)

A PSA was prepared as follows. The monomer pre-mix of Example 1 was prepared and was partially polymerized under a nitrogen-rich atmosphere by exposure to ultraviolet radiation yielding a syrup having a viscosity of about 1,000 cps. Following the polymerization, 0.28 parts of 2,2-dimethoxy-2-phenylacetophenone photoinitiator, 0.15 parts of alpha-methyl styrene, 0.05 parts of 1,6-hexanediol diacrylate, 0.05 parts of (3-glycidyloxypropyl)trimethoxysilane were added to the syrup. The syrup was then coated and cured between release liners as described in Example 1, producing Comparative Example CE-A.

Comparative Example B (CE-B)

A PSA was prepared as follows. A monomer premix was prepared, on a weight basis, using 87.5 parts iso-octylacrylate, 12.5 parts acrylic acid and 0.04 parts 2,2-dimethoxy-2-phenylacetophenone photoinitiator. This mixture was partially polymerized under a nitrogen-rich atmosphere by exposure to ultraviolet radiation to provide a syrup having a viscosity of about 2,000 cps. Following the polymerization, 0.19 parts of 2,2-dimethoxy-2-phenylacetophenone photoinitiator and 0.065 parts of 1,6-hexanediol diacrylate were added to the syrup. The syrup was then coated and cured between release liners as described in Example 1, producing Comparative Example CE-B.

Table 1 lists the component concentrations of the compositions of Examples 1 and 2 and Comparative Examples A and B.

TABLE 1

| Component | Ex. 1 | Ex. 2 | Ex. 3 | Ex. 4 | Ex. 5 | Ex. 6 | Ex. 7 | Ex. 8 | Ex. 9 | CE-A | CE-B |
|---|---|---|---|---|---|---|---|---|---|---|---|
| PREMIX | | | | | | | | | | | |
| 2-ethylhexyl acrylate | 55 | 35 | 78 | 75 | 70 | 70 | 70 | — | 69 | 55 | — |
| Iso-octyl acrylate | — | — | — | — | — | — | — | 87.5 | — | — | 87.5 |
| Iso-bornyl acrylate | 25 | 35 | — | — | — | — | — | — | 5 | 25 | — |
| VeoVa 9 | — | — | — | — | — | — | 10 | — | — | — | — |
| 2-hydroxyethyl acrylate | 20 | 10 | 10 | 10 | 10 | 10 | 20 | — | 19 | 20 | — |
| Ethoxyethoxyethyl acrylate | — | 20 | — | — | — | — | — | — | — | — | — |
| Acrylic Acid | — | — | — | — | — | — | — | 12.5 | — | — | 12.5 |
| Diacetone Acrylamide | — | — | — | — | 20 | — | — | — | 7 | — | — |
| N-tert-octylacrylamide | — | — | — | — | — | 20 | — | — | — | — | — |
| N,N-dimethyl acrylamide | — | — | — | 15 | — | — | — | — | — | — | — |
| 4-acryloylmorpholine | — | — | 12 | — | — | — | — | — | — | — | — |
| 2-hydroxy-2-methyl-1-phenyl-1-propan-1-one | 0.02 | 0.02 | 0.02 | — | 0.02 | 0.02 | — | — | 0.02 | 0.02 | — |
| 2,2-dimethoxy-2-phenylacetophenone | — | — | — | 0.04 | — | — | — | 0.04 | — | — | 0.04 |
| FINAL CURE (between release liners) | | | | | | | | | | | |
| 2,2-dimethoxy-2-phenylacetophenone | 0.43 | 0.31 | 0.38 | 0.31 | 0.2 | 0.2 | 0.2 | 0.36 | 0.2 | 0.28 | 0.19 |
| 1,6-hexanediol diacrylate | 0.05 | 0.05 | — | — | 0.075 | 0.075 | 0.1 | 0.05 | 0.1 | 0.05 | 0.065 |
| Alpha-methyl styrene | 0.3 | 0.1 | — | — | — | — | — | 0.2 | — | 0.15 | — |
| Karenz MT PE1 | — | — | — | — | 0.3 | 0.3 | 0.3 | — | 0.3 | — | — |
| (3-glycidyloxypropyl)trimethoxysilane | 0.05 | 0.05 | — | — | — | — | — | — | — | 0.05 | — |

Using the lamination procedure described above, glass/PSA/glass laminates were prepared using each PSA (Examples and Comparative Examples). Five laminates were prepared from each PSA type. The number of defective laminates was monitored after various phases of the lamination process (after vacuum lamination and after autoclave) and the number of laminates showing new bubbles after the 24 Hour Dwell and the durability test were also monitored. Defects, i.e. bubbles, were determined by visual observation. The results are shown in Table 2.

TABLE 2

| | Tan Delta Value | | | No. of laminates tested | No. of defective laminates after vacuum lamination | No. of defective laminates after autoclave | No. of laminates with new bubbles after 24 Hour Dwell | No. of laminates with new bubbles after Durability Test |
|---|---|---|---|---|---|---|---|---|
| | 50° C. | 75° C. | 100° C. | | | | | |
| Ex. 1 | 0.66 | 0.74 | 0.77 | 5 | 1 | 1 | 1 | 0 |
| Ex. 2 | 0.61 | 0.66 | 0.69 | 5 | 1 | 1 | 1 | 0 |
| Ex. 3 | 0.61 | 0.73 | 0.86 | 5 | 1 | 1 | 0 | 0 |
| Ex. 4 | 0.60 | 0.61 | 0.76 | 5 | 1 | 1 | 0 | 0 |
| Ex. 5 | 0.70 | 0.82 | 0.90 | 5 | 1 | 0 | 0 | 0 |
| Ex. 6 | 0.76 | 0.91 | 0.99 | 5 | 1 | 0 | 0 | 0 |
| Ex. 7 | 0.62 | 0.63 | 0.63 | 5 | 1 | 1 | 0 | 0 |
| Ex. 8 | 0.67 | 0.75 | 0.94 | 5 | 1 | 0 | 0 | 0 |
| Ex. 9 | 0.55 | 0.60 | 0.65 | 5 | 1 | 0 | 0 | 0 |
| CE-A | 0.46 | 0.47 | 0.49 | 5 | 2 | 1 | 2 | 3 |
| CE-B | 0.45 | 0.30 | 0.30 | 5 | 5 | 3 | 4 | 5 |

Comparing the defect results to the DMTA tan delta in Table 2, it is apparent that laminates having high tan delta values exhibited a lower number of defects. This was particularly true when the tan delta was greater than about 0.5 at temperatures greater than about 50° C. As can be seen, the tan delta values remain above 0.6 with increasing temperature above about 75° C.

Figure 1:
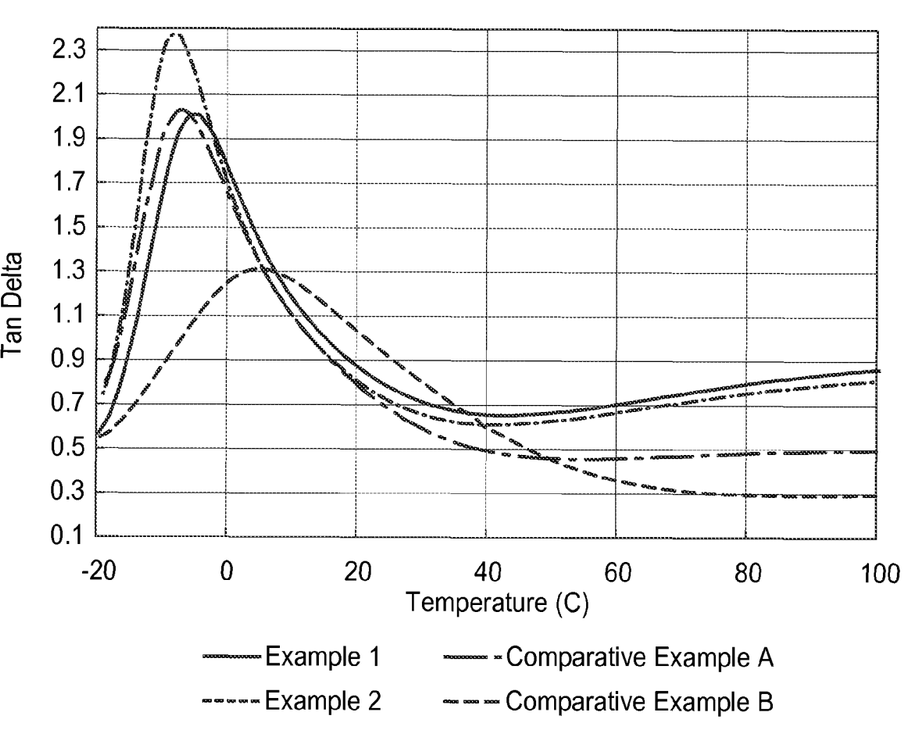
The sole FIGURE is a graph showing DMTA measurements of various adhesive compositions of the present invention and comparative adhesives compositions.

The results of the DMTA measurements of the inventive examples (Examples 1 to 9) and the comparative examples (Comparative Examples A and B) and the results of the lamination study illustrate that good lamination results were obtained when the tan delta values were high (particularly >0.5) at about 50° C. and exceeded these values with increasing temperature. More specifically, the adhesives of Examples 1 to 9 had tan delta values that exceeded 0.5 at temperatures between about 50° C. and about 100° C.

Although the present invention has been described with reference to particular embodiments, those of skill in the art will recognize that changes may be made in form and detail without departing from the spirit and scope of the invention.

The invention claimed is:

1. An adhesive composition comprising:
 a polymer made from a pre-mix comprising monomers comprising:
 an alkyl (meth)acrylate ester, wherein the alkyl group has 4 to 18 carbon atoms, or an aryl (meth)acrylate ester, selected from 2-ethylhexyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, phenyl (meth)acrylate, benzyl (meth)acrylate, isostearyl acrylate, 2-methylbutyl (meth)acrylate, and combinations thereof; and
a hydrophilic copolymerizable monomer selected from acrylic acid, methacrylic acid, itaconic acid, fumaric acid, methacrylamide, N—(C1-C3)alkyl-substituted acryl amide, N—(C1-C3)alkyl-substituted methacrylamide, N,N-di(C1-C3)alkyl-substituted acrylamide, N,N-di(C1-C3)alkyl-substituted methacrylamide, 2-hydroxyethyl acrylate, 2-hydroxypropyl acrylate, 4-hydroxybutyl acrylate, 2-ethoxyethoxyethyl acrylate, 2-methoxyethoxyethyl acrylate, acrylamide, N-morpholino acrylate, and combinations thereof; and
an acrylic oligomer made from monomers comprising (C1-C20)alkyl (meth)acrylate monomers, wherein the acrylic oligomer has a Tg below 25° C. and a weight average molecular weight of at least 1,000 and no more than the oligomer's entanglement molecular weight;
wherein the adhesive composition retains a tan delta value of between about 0.5 and about 1.0 over a temperature range of between about 25° C. and about 100° C. and a frequency of 1 Hz; and
wherein the adhesive composition is optically clear, having at least 85% transmission over the range of from 460 to 720 nm.

2. The adhesive composition of claim 1, wherein the adhesive composition retains a tan delta value of between about 0.6 and about 0.8 over a temperature range of between about 25° C. and about 100° C. and a frequency of 1 Hz.

3. The adhesive composition of claim 1, wherein the alkyl(meth)acrylate ester is selected from the group consisting of: 2-ethylhexyl acrylate (2-EHA), isobornyl acrylate (IBA), iso-octylacrylate (IOA) and butyl acrylate (BA).

4. The adhesive composition of claim 1, wherein the hydrophilic copolymerizable monomer is selected from the group consisting of: acrylic acid (AA), 2-hydroxyethyl acrylate (HEA), hydroxypropyl acrylate (HPA), ethoxyethoxyethyl acrylate, acrylic amide (Acm), N,N-dimethylacrylamide, and N-morpholino acrylate (MoA).

5. The adhesive composition of claim 1, wherein the pre-mix further comprises a free-radical generating initiator.

6. The adhesive composition of claim 5, wherein the pre-mix includes between about 0.05 parts and about 2 parts free-radical generating initiator.

7. The adhesive composition of claim 1, wherein the pre-mix includes between about 5 parts and about 40 parts of the hydrophilic copolymerizable monomer.

8. The adhesive composition of claim 1, wherein the pre-mix includes between about 60 parts and about 95 parts of the alkyl (meth)acrylate ester.

9. The adhesive composition of claim 1, wherein the acrylic oligomer is made in-situ using a molecular weight control agent.

10. The adhesive composition of claim 1, wherein the oligomer has a hydroxyl number of from about 20 mg KOH/g to about 500 mg KOH/g.

11. The adhesive composition of claim 1, wherein the oligomer has a number average molecular weight of about 500 to about 10,000.

12. A laminate comprising:
a first substrate;
a second substrate; and
an adhesive composition positioned between the first and second substrates, wherein the adhesive composition comprises:
a polymer made from a pre-mix comprising monomers comprising:
an alkyl (meth)acrylate ester, wherein the alkyl group has 4 to 18 carbon atoms, or an aryl (meth)acrylate ester, selected from 2-ethylhexyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, phenyl (meth)acrylate, benzyl (meth)acrylate, isostearyl acrylate, 2-methylbutyl (meth)acrylate, and combinations thereof; and
a hydrophilic copolymerizable monomer selected from acrylic acid, methacrylic acid, itaconic acid, fumaric acid, methacrylamide, N—(C1-C3)alkyl-substituted acryl amide, N—(C1-C3)alkyl-substituted methacrylamide, N,N-di(C1-C3)alkyl-substituted acrylamide, N,N-di(C1-C3)alkyl-substituted methacrylamide, 2-hydroxyethyl acrylate, 2-hydroxypropyl acrylate, 4-hydroxybutyl acrylate, 2-ethoxyethoxyethyl acrylate, 2-methoxyethoxyethyl acrylate, acrylamide, N-morpholino acrylate, and combinations thereof; and
an acrylic oligomer made from monomers comprising (C1-C20)alkyl (meth)acrylate monomers, wherein the acrylic oligomer has a Tg below 25° C. and a weight average molecular weight of at least 1,000 and no more than the oligomer's entanglement molecular weight;
wherein the adhesive composition retains a tan delta value of between about 0.5 and about 1.0 over a temperature range of between about 25° C. and about 100° C. and a frequency of 1 Hz; and
wherein the adhesive composition is optically clear, having at least 85% transmission over the range of from 460 to 720 nm.

13. The laminate of claim 12, wherein at least one of the first and second substrates includes an ink step.

14. The laminate of claim 13, wherein at least one of the first and second substrates includes an ink step of 50-70 μm, and wherein the adhesive thickness is no more than 250 μm.

15. The laminate of claim 12, wherein the adhesive thickness is at least 150 μm.

16. The laminate of claim 12, wherein at least one of the first and second substrates is substantially transparent.

17. The laminate of claim 12, wherein the acrylic oligomer is made in-situ using a molecular weight control agent.

18. A method of assembling a laminate comprising:
providing an adhesive composition, wherein the adhesive composition comprises:
a polymer made from a pre-mix comprising monomers comprising:
an alkyl (meth)acrylate ester, wherein the alkyl group has 4 to 18 carbon atoms, or an aryl (meth)acrylate ester, selected from 2-ethylhexyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, phenyl (meth)acrylate, benzyl (meth)acrylate, isostearyl acrylate, 2-methylbutyl (meth)acrylate, and combinations thereof; and a hydrophilic copolymerizable monomer selected from acrylic acid, methacrylic acid, itaconic acid, fumaric acid, methacrylamide, N—(C1-C3)alkyl-substituted acrylamide, N—(C1-C3)alkyl-substituted methacrylamide, N,N-di(C1-C3)alkyl-substituted acrylamide, N,N-di(C1-C3)alkyl-substituted methacrylamide, 2-hydroxyethyl acrylate, 2-hydroxypropyl acrylate, 4-hydroxybutyl acrylate, 2-ethoxyethoxyethyl acrylate, 2-methoxyethoxyethyl acrylate, acrylamide, N-morpholino acrylate, and combinations thereof; and an acrylic oligomer made from monomers comprising (C1-C20)alkyl (meth)acrylate monomers, wherein the acrylic oligomer has a Tg below 25° C. and a weight average molecular weight of at least 1,000 and no more than the oligomer's entanglement molecular weight;

wherein the adhesive composition is optically clear, having at least 85% transmission over the range of from 460 to 720 nm;

laminating the adhesive composition at a temperature of between about 20° C. and about 60° C.; and autoclaving the adhesive composition;

wherein the adhesive composition retains a tan delta value of between 0.5 and 1.0 over a temperature range of between 25° C. and 100° C.

19. The method of claim 18, wherein the acrylic oligomer is made in-situ using a molecular weight control agent.

* * * * *

UNITED STATES PATENT AND TRADEMARK OFFICE
CERTIFICATE OF CORRECTION

PATENT NO. : 9,879,161 B2
APPLICATION NO. : 13/985602
DATED : January 30, 2018
INVENTOR(S) : Jianhui Xia et al.

It is certified that error appears in the above-identified patent and that said Letters Patent is hereby corrected as shown below:

Column 5
Line 16, delete "4-hydro xybutylacrylate," and insert -- 4-hydroxybutylacrylate, --, therefor.

Column 5
Line 17, delete "(Visco at -190)," and insert -- (Viscoat -190), --, therefor.

Signed and Sealed this
Twenty-fourth Day of July, 2018

Andrei Iancu
*Director of the United States Patent and Trademark Office*